A. D. Stowell,
Tenoning and Boring Machine,
Nº 15,593.  Patented Aug. 19, 1856.
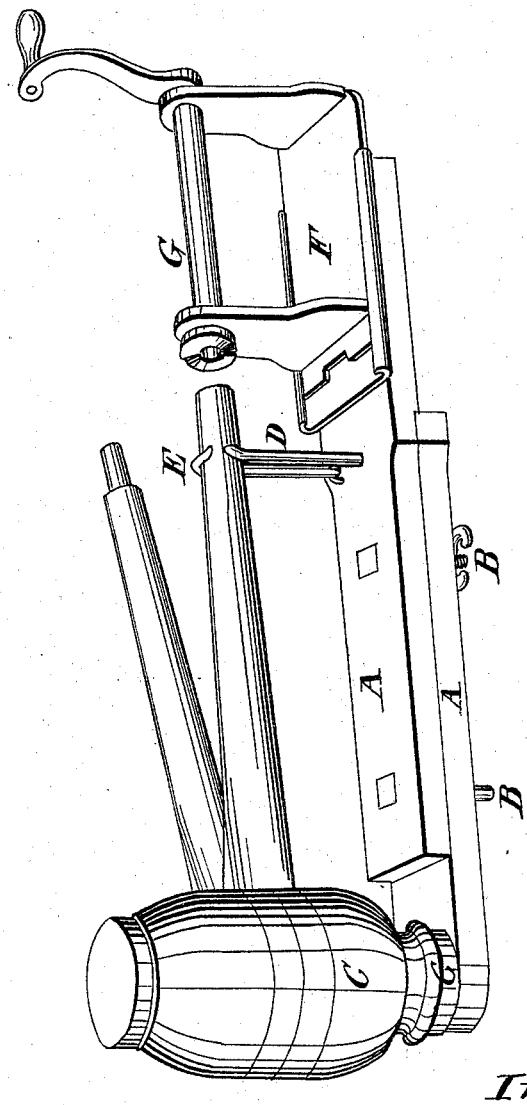
Witnesses.
J. B. Crane.
E. J. Weaver
Inventor.
A. D. Stowell

UNITED STATES PATENT OFFICE.

ABIJAH D. STOWELL, OF FULTON, NEW YORK, ASSIGNOR TO JNO. A. PLACE, OF FULTON, NEW YORK.

WHEELWRIGHT'S MACHINE.

Specification of Letters Patent No. 15,593, dated August 19, 1856.

*To all whom it may concern:*

Be it known that I, ABIJAH D. STOWELL, of Fulton, county of Oswego, and State of New York, have invented a new and useful machine for setting spokes in carriage hubs and making the tenons for receiving the fellies, called "Stowell's combined spoke set and tenoning machine;" and I do hereby declare that the following is a full, clear, and exact description of the construction and operation of the same, reference being had to the annexed drawing, making a part of this specification, the same being a perspective view.

The spoke set, as seen in the drawing is represented by the two straight pieces ($a\ a$) which are joined together by the thumb screws ($b\ b$). The set is attached to the front end of the hub ($c$) by a bolt passed through the hub from the front end.

($d$) is a gage provided with a screw passing through the set at the lower end of slide ($f$) which can be adjusted to any required dish by means of the screw. ($e$) is a hook fastened to the set at the same point with the gage ($d$) by means of a staple or eye bolt. Said hook is for the purpose of securing the spoke permanently to the gage ($d$) while the tenon is being made.

($f$) is a carriage carrying the hollow auger ($g$) which carriage can be slipped out of the grooves and laid one side while the spokes are being driven into the hub.

To work the machine, I place the hub in a wheel pit, common to all carriage shops and constructed as follows: Two heavy timbers are placed on legs in the form of a bench, said timbers being parallel to each other some four inches apart; the hub is placed cross wise of the pit, one end of hub resting on each timber in a hollow made to receive it. I then attach the set to the front end of the hub as seen in the drawing, with the carriage ($f$) containing the hollow auger ($g$) detached. I set the gage ($d$) to the proper length for my spokes by means of the thumb screws ($b\ b$). I drive the spokes in my hub, regulating the disk by the gage ($d$). Having driven all of the spokes in the hub I insert the carriage ($f$) at the top of the set, pass the set to a spoke and secure the spoke to the gage ($d$) by the hook ($e$). I then pass the carriage ($f$) with hollow auger ($g$) downward turning the crank until the carriage ($f$) rests on the gage ($d$) and the auger ($g$) will cut no farther, after which I raise the carriage ($f$) until the hollow auger ($g$) will clear the end of the spoke, unclasp the hook ($e$) and pass the set ($a\ a$) to the next spoke and proceed as before until the whole are tenoned.

I claim—

The combination of the spoke set with the carriage carrying the hollow auger when the whole is attached to the hub while resting over the pit, in the manner set forth.

A. D. STOWELL.

Witnesses:
CHARLES W. BOOKER,
EDWARD M. MOODY.